United States Patent Office 3,328,138
Patented June 27, 1967

3,328,138
MOTOR FUEL
Robert E. Malec and Roy J. Betty, Jr., Chicago, Ill., assignors to Armour and Company, Chicago, Ill., a corporation of Delaware
No Drawing. Filed Mar. 9, 1964, Ser. No. 350,571
7 Claims. (Cl. 44—71)

This invention relates to an improved hydrocarbon fuel composition, and particularly, to a gasoline composition containing a novel additive agent which functions to reduce existing deposits to prevent the formation of additional deposits in the induction system of spark-ignition internal combustion engines.

Modern high-compression engine design with the associated multi-throat carburetors has resulted in stringent fuel requirements to maintain prime engine performance. Problems resulting from present fuel compositions have been accentuated by the widespread use of these design improvements in automobiles. Resulting poor engine performance, such as stalling and rough idling, is both annoying and uneconomical.

A primary cause of poor engine performance is the accumulation of deposits in the fuel induction system. These deposits normally occur in the intake manifolds, on intake valves, and in the carburetor. Particularly important is the accumulation of deposits in the throttle body section of the carburetor. These deposits directly affect the air to fuel ratio presented to the combustion chamber. Deposits of this nature are particularly detrimental to the idling qualities of the engine, causing rough idling and stalling. To compensate for the accumulation of these deposits, the fuel flow must be modified to maintain optimum combustion performance. Periodic mechanical adjustments and engine reconditioning are obviously poor methods for overcoming the objectional features produced by these deposits.

The trouble-causing deposits in the fuel induction system of internal combustion engines result primarily from contaminants in the carburetor intake air. The greatest source of intake air contaminants is engine blowby. Normal air pollutants such as smoke, exhaust and dust also contribute to the formation of deposits.

Recent requirements to reduce air pollution resulting from internal combustion engines, namely automobiles, have greatly increased the problem of engine blowby in fuel induction systems. Some of the principal methods of reducing the pollution of air by automobile engines comprise feeding the blowby gas back into the fuel induction system for recombustion. The enhancement of the problem of deposits in the fuel induction system by a substantial increase in blowby gas is readily apparent.

It is, therefore, an object of this invention to provide an improved hydrocarbon fuel composition for more efficient operation of spark-ignition internal combustion engines.

It is, more particularly, an object of this invention to provide an improved tydrocarbon fuel composition effective for inhibition of formation of deposits in the induction system of spark-ignition internal combustion engines.

A further object is to provide an improved hydrocarbon fuel composition effective for the removal of pre-existing deposits in the induction system of spark-ignition internal combustion engines.

Other specific objects and advantages will appear as the specification proceeds.

In one embodiment of our invention, we incorporate in a hydrocarbon base fuel, boiling within the gasoline boiling range, a minor proportion of a hydrocarbon soluble higher hydroxamic acid. The term "higher hydroxamic acid" used herein refers to compounds having a total of eight or more carbon atoms. Mixtures of these hydroxamic acids may also be used. Relatively small quantities of higher hydroxamic acids are sufficient to obtain the detergent effect of the present invention. Excellent results have been obtained when the additive constitutes from about 5 to 70 parts to a million parts of the fuel. We prefer to employ from about 30 to 60 parts per million of the additive in gasoline to achieve the objects of this invention. It will be understood that concentrations below the ranges just set out will provide some degree of reduction of deposits. Likewise, substantially higher concentrations than those referred to will provide satisfactory results, although there are practical considerations which limit the desirability of greater amounts of additive.

The class of compounds effective for the purposes of our invention may be represented by the following general formula:

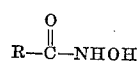

and the tautomeric form

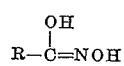

wherein R is an alkyl, aryl, alkylated aryl, aralkyl, cycloparaffinic, alkyl substituted by cycloparaffinic, cyclo-olefinic, or alkyl substituted by cyclo-olefinic radical. The aliphatic portion of the radical may have from 7 to 22 carbon atoms. When the alkyl radical is substituted, for instance by an aryl group, the entire radical may have a total of from 7 to 28 carbon atoms. The aliphatic portion of the radical may be saturated or unsaturated, straight chain or branched.

Non-limiting examples of aliphatic radicals coming within the definition of R include heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, oleyl, heptadecenyl, linoleyl, heptadecadienyl.

Especially good results according to the objects of this invention have resulted in instances where the oleyl or the phenyl stearyl residue radical have been present in the hydroxamic acid molecule.

The additives of this invention may be prepared in accordance with conventional reactions of hydroxylamine hydrochloride and organic acid esters in the presence of a metal hydroxide.

The additives of the invention may be used in association with other fuel additives and with solvents.

The following examples illustrate the unique deposit-reducing and deposit-removing characteristics of hydrocarbon fuel having incorporated therein effective amounts of higher hydroxamic acids.

Example I

A 1959 Chevrolet, 6 cylinder engine, was employed to evaluate carburetor detergents. The blowby gas was brought back into the carburetor to accelerate the deposit build-up. Each test period comprised running the engine, with the fuel indicated, for five hours at an idle speed, $600 \pm 100$ r.p.m. as recorded on a tachometer. Approximately five gallons of gasoline was used during this period of time. The carburetor was freshly cleaned prior to each test. Following this test, the carburetor was dismantled and rated visually as to the percentage of the area under the throttle plate free from deposits. Table I is a summary of results of separate tests conducted according to the above procedure.

TABLE I

| Fuel | Additive (p.p.m.) | Rating (Percent Clean Area Under Throttle Plate) |
|---|---|---|
| 1. Base* | 0 | 0–20 |
| 2. Base Plus Oleyl Hydroxamic Acid | 50 | 80 |
| 3. Base Plus Phenyl Stearyl Hydroxamic Acid | 50 | 70 |

*The base fuel employed was a commercial leaded gasoline representative of nationally-available commercial gasolines.

Example II

The procedure of Example I was followed except that heavy deposits were deliberately accumulated in the carburetor prior to the test period. These deposits were built up by running the engine for five hours using only the commercial leaded gasoline base fuel. Following the five hour deposit accumulation run, the visual rating showed 0–20 percent of the area under the throttle plate was free from deposits. The test engine, with pre-existing deposits in the fuel induction system, was then run for five hours with the fuel composition of the commercial leaded gasoline base fuel to which was added phenyl stearyl hydroxamic acid to the amount of 50 parts per million parts of gasoline. After the five hour test run with 50 p.p.m. phenyl stearyl hydroxamic acid added to the fuel, the carburetor was dismantled and visual rating showed 70% of the area under the throttle plate was free from deposits.

The foregoing specification has set out specific compositions and quantities in considerable detail for the purpose of illustrating some embodiments of this invention. It is clear that compositions may be varied widely by those skilled in the art without departing from the spirit of this invention.

We claim:

1. An improved fuel composition comprising a major portion of a hydrocarbon fuel, boiling within the gasoline boiling range, having incorporated therein hydroxamic acid having the general formula:

$$R-\overset{O}{\underset{\|}{C}}-NHOH$$

wherein R is selected from the group consisting of alkyl, aryl, alkylated aryl, aralkyl and cycloparaffinic radicals having from 7 to 28 carbon atoms, the concentration of said acid being greater than 5 parts to a million parts of gasoline.

2. An improved motor fuel composition comprising a hydrocarbon fuel, boiling within the gasoline boiling range, having incorporated therein from about 5 to 70 parts per million of hydroxamic acid having the general formula:

$$R-\overset{O}{\underset{\|}{C}}-NHOH$$

wherein R is an aliphatic hydrocarbon radical having from 7 to 22 carbon atoms.

3. An improved motor fuel composition comprising a hydrocarbon fuel, boiling within the gasoline boiling range, having incorporated therein from about 30 to 60 parts per million of a mixture of acids having the general formulas:

$$R-\overset{O}{\underset{\|}{C}}-NHOH$$

and $$R-\underset{\|}{\overset{OH}{C}}=NOH$$

wherein R is an aliphatic hydrocarbon radical having from 7 to 22 carbon atoms.

4. An improved motor fuel composition comprising a hydrocarbon fuel, boiling within the gasoline boiling range, having incorporated therein from about 5 to 70 parts per million of hydroxamic acid having the general formula:

$$R-\overset{O}{\underset{\|}{C}}-NHOH$$

wherein R is an aralkyl radical having a total of from 7 to 28 carbon atoms.

5. An improved motor fuel composition comprising a hydrocarbon fuel, boiling within the gasoline boiling range, having incorporated therein from about 30 to 60 parts per million of a mixture of acids having the following formula:

$$R-\overset{O}{\underset{\|}{C}}-NHOH$$

and $$R-\underset{\|}{\overset{OH}{C}}=NOH$$

wherein R is an aralkyl radical having a total of from 7 to 28 carbon atoms.

6. An improved fuel composition comprising a hydrocarbon fuel, boiling within the gasoline boiling range, having incorporated therein from about 30 to 60 parts per million of oleyl hydroxamic acid.

7. An improved fuel composition comprising a hydrocarbon fuel, boiling within the gasoline boiling range, having incorporated therein from about 30 to 60 parts per million of phenyl stearyl hydroxamic acid.

References Cited

UNITED STATES PATENTS

| | | | |
|---|---|---|---|
| 2,279,560 | 4/1942 | Dietrich | 260—500 |
| 2,397,508 | 4/1946 | Rouault et al. | 260—500 |
| 2,818,429 | 12/1957 | Beretvas | 260—500 |

DANIEL E. WYMAN, *Primary Examiner.*

C. F. DEES, *Assistant Examiner.*